Figure 1:
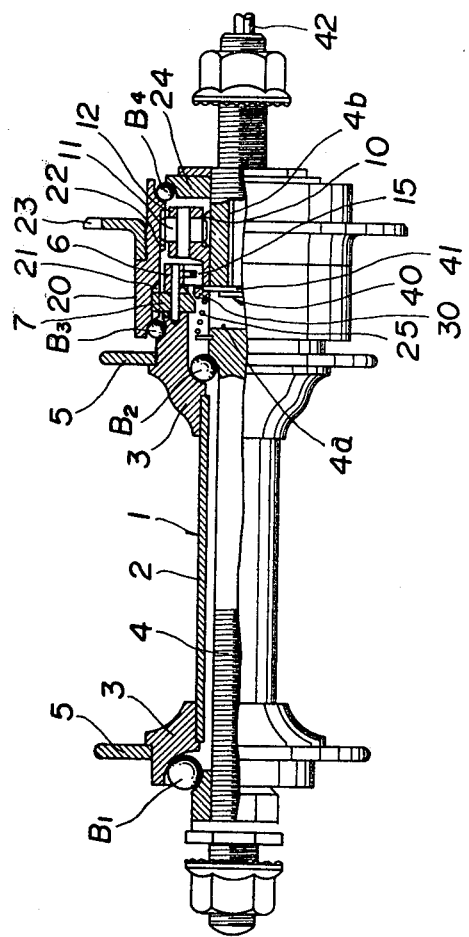

United States Patent [19]

Fukui

[11] 4,276,973
[45] Jul. 7, 1981

[54] CONTROL MECHANISM FOR A TRANSMITTING-PAWL AT A TRANSMISSION HUB FOR A BICYCLE

[75] Inventor: Seiji Fukui, Sakai, Japan
[73] Assignee: Shimano Industrial Company, Limited, Osaka, Japan
[21] Appl. No.: 72,401
[22] Filed: Sep. 4, 1979

[30] Foreign Application Priority Data

Sep. 13, 1978 [JP] Japan .................. 53-126648[U]
Jan. 30, 1979 [JP] Japan .................. 54-11260[U]

[51] Int. Cl.³ .................. G05G 1/00; F16H 3/44; F16D 41/30; F16D 41/26
[52] U.S. Cl. .................. 192/47; 74/781 B; 74/750 B
[58] Field of Search .......... 74/575, 577 R, 577 S, 74/781 B, 750 B, 149, 155, 567; 192/47; 188/82.2, 82.3

[56] References Cited

U.S. PATENT DOCUMENTS

| 3,166,171 | 1/1965 | Schwerdhofer et al. ........ 74/577 X |
| 3,973,451 | 8/1976 | Kine ............................ 74/781 B X |
| 4,097,702 | 6/1978 | Halsted ........................ 74/567 X |

FOREIGN PATENT DOCUMENTS

| 929792 | 7/1955 | Fed. Rep. of Germany ........... 74/567 |
| 873849 | 4/1942 | France ........................ 74/781 B |
| 140659 | 4/1949 | Sweden ........................ 74/781 B |
| 215275 | 4/1941 | Switzerland . |
| 29341 | of 1906 | United Kingdom .............. 74/781 B |

*Primary Examiner*—C. J. Husar
*Assistant Examiner*—Philip W. Thor
*Attorney, Agent, or Firm*—Stevens, Davis, Miller & Mosher

[57] ABSTRACT

A control mechanism for controlling/transmitting-pawl at a transmission hub for a bicycle, which comprises a pawl control member and an operating member. The pawl control member is substantially cylindrical and is provided at the rear side thereof in its direction of moving the pawl to a pausal condition with a holding portion formed by the peripheral surface of the control member which contacts with the pawl to keep it in the pausal condition, at the front side in the same direction with at least one pawl-receiving portion of a depressed face for receiving therein the pawl in an active condition, and at both circumferential sides of the pawl-receiving portion with control portions formed in continuation of the depressed face and peripheral surface and having slant faces for controlling in the pausal condition the pawl received within the pawl-receiving portion.

5 Claims, 8 Drawing Figures

CONTROL MECHANISM FOR A TRANSMITTING-PAWL AT A TRANSMISSION HUB FOR A BICYCLE

This invention relates to a control mechanism for a transmitting-pawl at a transmission hub for a bicycle, and more particularly to a control mechanism for/transmitting-pawl which is supported swingably to/pin parallel to a hub shaft at the transmission hub for the bicycle and kept always in an active condition by means of a pawl spring.

This kind of control mechanism generally comprises a pawl control member and an operating member therefor. The operating member operates to move the control member forward or backward in one axial direction of the hub shaft so that the control member puts the transmitting-pawls in a pausal or active condition against or through the pawl spring.

Figure 8:
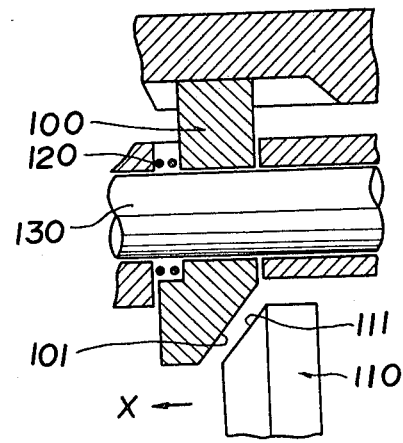

In a conventional control mechanism shown in FIG. 8, transmitting-pawls each have at the rear side thereof a slant face 101, and a pawl control member 110 is provided at the front side thereof in its moving direction (the arrow X direction as shown) with a frustum face 111 for controlling the pawls 100 in a pausal condition, so that the frustum face 111 contacts with the slant face 101 to control the pawls 100 in the pausal condition against a return spring 120.

The transmitting pawls 100, when controlled in the manner are subjected to the biasing force by the axial movement of control member 110 so as to be kept in a pausal condition, in which the biasing force mostly acts axially on the pawls 100, hence, a small component of the force merely acts on the pawls through the frustum face 111 to swing them for retention in the pausal condition.

As a result, the problem occurs that the transmitting pawls 100 are not smoothly controlled in the pausal condition and the pawls 100 and supporting shafts 130 therefor are overstrained resulting in a lack of durability.

In order to overcome the aforesaid problem, this invention has been designed. An object of the invention is to provide a control mechanism for controlling/transmitting-pawl at a transmission hub for a bicycle, which is capable of always applying to the transmitting-pawl the proper force to control it in an active or pausal condition, of controlling the pawl smoothly and reliably with a small operating force, and of performing the stable pawl control for a long time.

In detail, the control mechanism of the invention is characterized in that the pawl control member is substantially cylindrical shaped and is provided; at the rear side thereof in its direction of moving the pawl to the pausal condition with a holding portion formed by the peripheral surface of the control member which contracts with the pawl to keep it in the pausal condition; at the front side in the same direction with at least one pawl-receiving portion having a depressed face for receiving therein the pawl in an active condition; and at both circumferential sides of the pawl-receiving portion with control portions formed in continuation of the depressed face and peripheral surface and having slant faces for controlling in the pausal condition the pawl received in the pawl-receiving portion. Hence, the pawl control member moves to control the transmitting-pawl smoothly and reliably in the pausal condition, so that the pawl and a supporting shaft therefor may not be overstrained, thereby improving durability.

Figure 2:
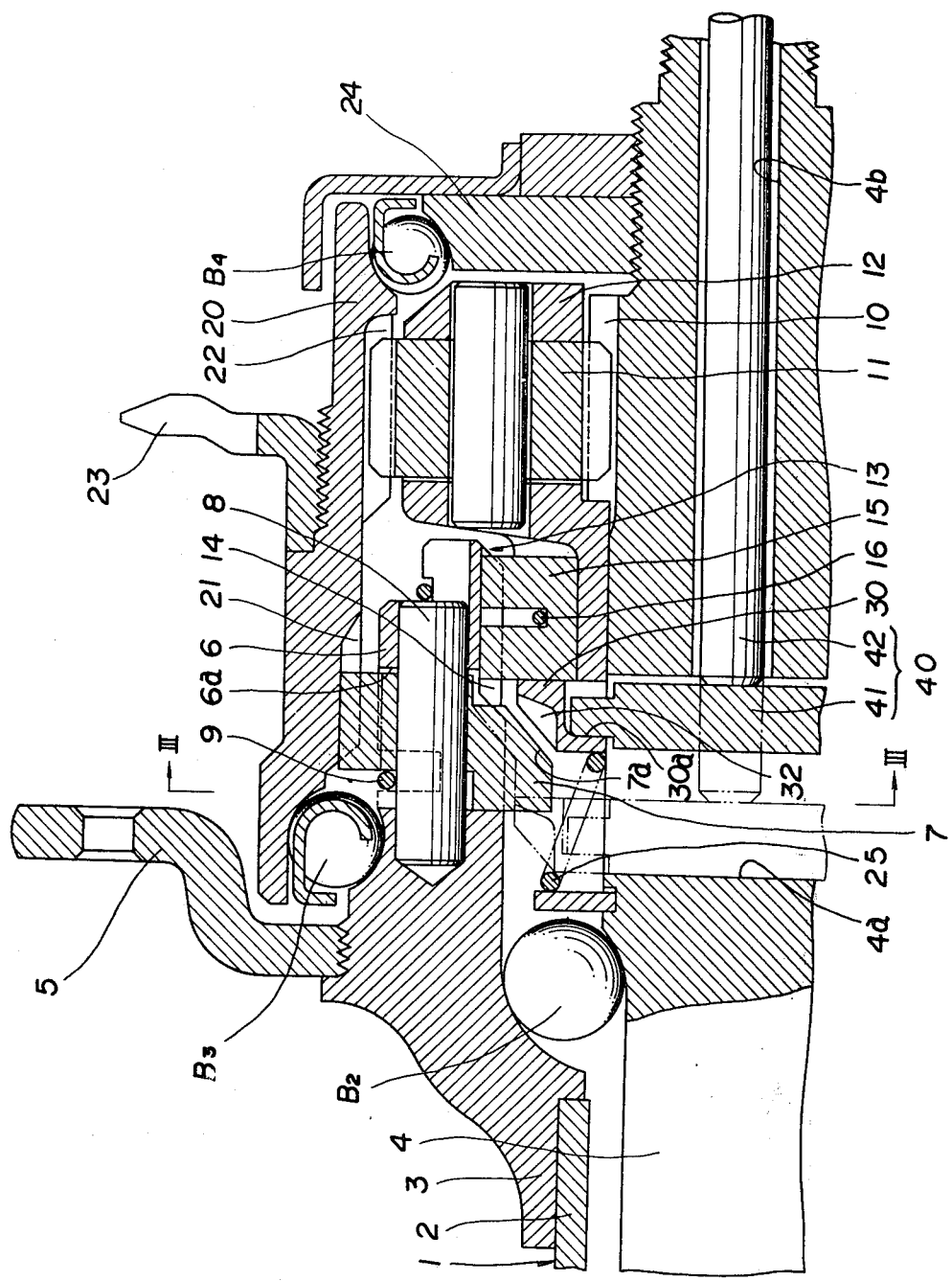
Figure 3:
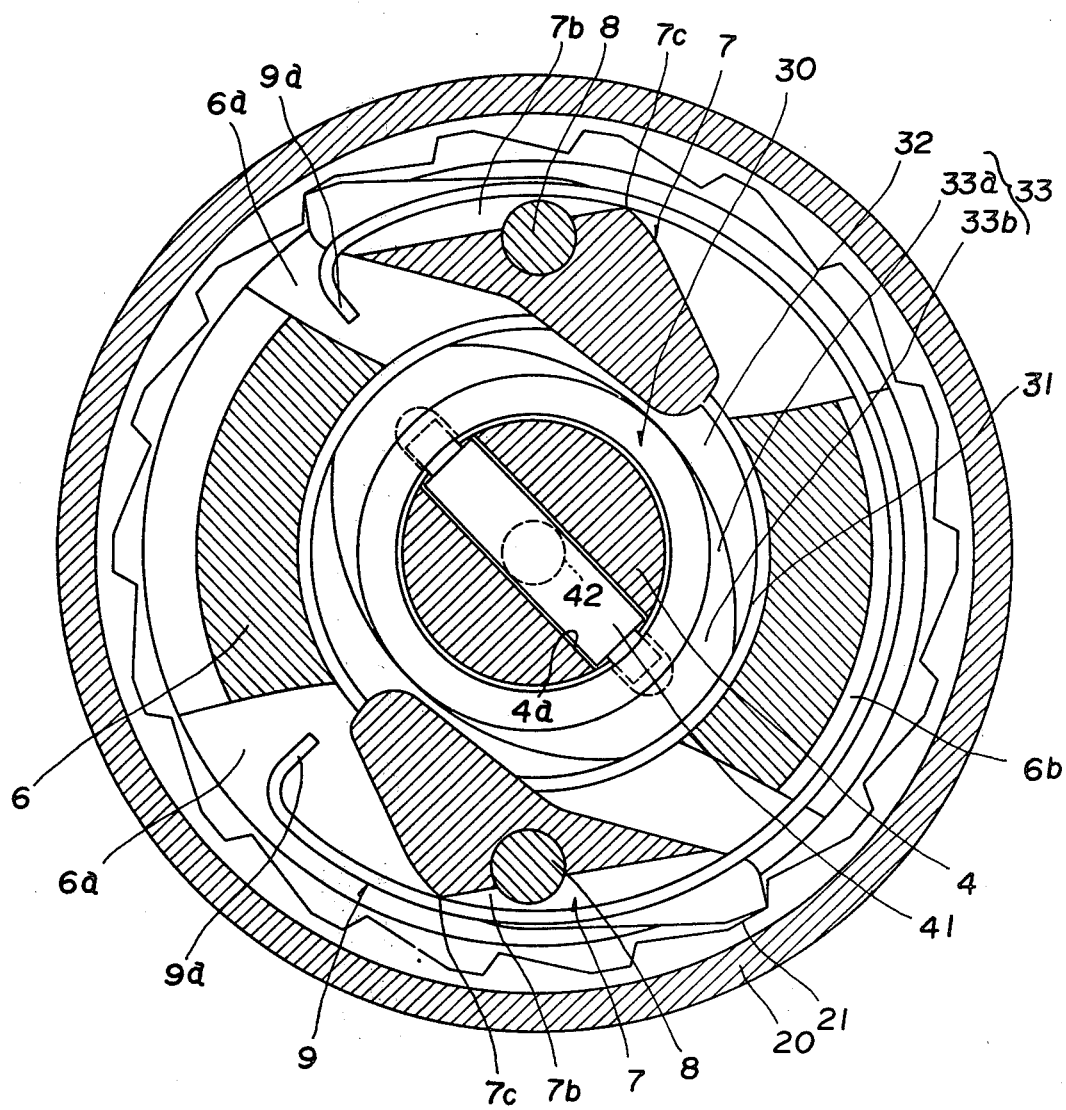
Figure 4:
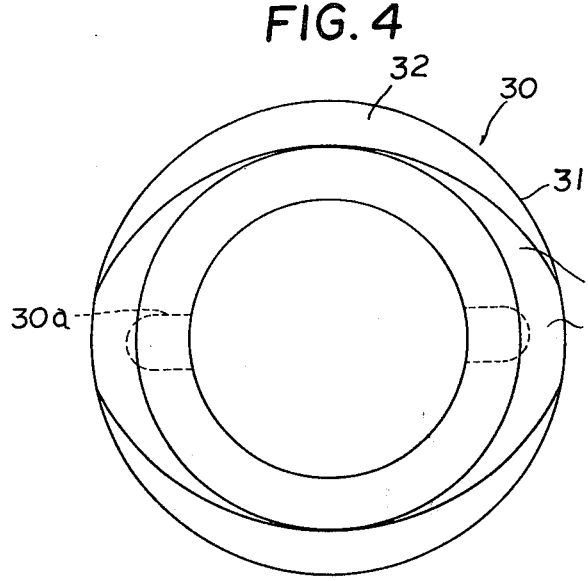
Figure 5:
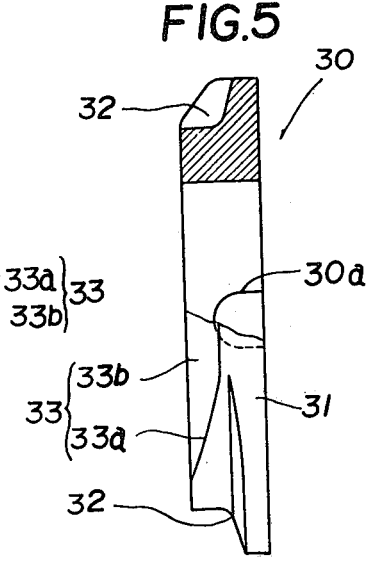
Figure 6:
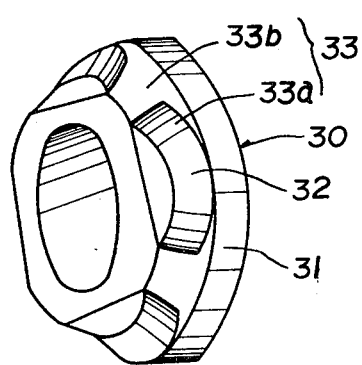
Figure 7:
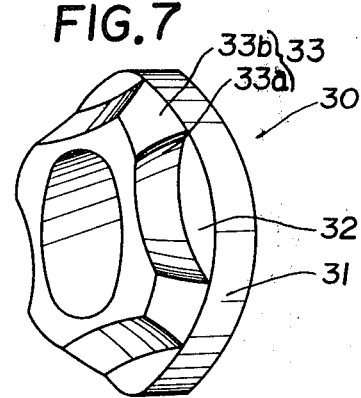

These and other objects and novel features of the invention will be more apparent from the description of embodiments thereof in accordance with the accompanying drawings, in which:

FIG. 1 is a partially cutaway front view of an example of transmission hub for a bicycle, in which a control mechanism of the invention is applied, FIG. 2 is an enlarged sectional view of the principal portion of FIG. 1, FIG. 3 is a sectional view taken on Line III—III in FIG. 2, FIG. 4 is a front view of a pawl control member only, FIG. 5 is a partially cutaway side view thereof looking from the right-side, FIG. 6 and 7 are perspective views of modified embodiments of the pawl control member, and FIG. 8 is a sectional view for explanation of a conventional pawl control mechanism.

A two-stage transmission hub is shown in FIGS. 1 through 3, in which reference numeral 1 designates a hub body. The hub body 1 comprises a hub shell 2 made from pipe-material and a pair of hub end portions 3 having hub flanges 5 provided at both axial ends of the hub shell 2. Reference numeral 4 designates a hub shaft fixed to the bicycle frame. The hub body 1 is supported rotatably to the hub shaft 4 through a pair of ball bearings $B_1$ and $B_2$.

One hub end portion 3 extends axially outwardly over the hub flange 5 to form a cylindrical extension 6. The extension 6 carries at its lengthwise intermediate portion first transmitting-pawls 7 in relation of being swingable.

In detail at a lengthwise intermediate portion of the cylindrical extension 6 are provided two through bores 6a which are shifted at an angle of 180°. The transmitting-pawls 7 are inserted into the bores 6a and are pivotally supported to the extension 6 by pivots 8 parallel to the hub shaft 4 respectively, and biased by a pawl spring 9 so that the pawl tips tend to always mesh with ratchet teeth 21 at a driving member 20 to be hereinafter described. The tails of pawls 7, when the pawl tips mesh with the ratchet teeth 21, project radially inwardly from the inner surface of extension 6 through the bores 6a. Slant faces 7a for contacting with a pawl control member 30 to be hereinafter described are provided at the tails of pawls 7 respectively, so that the pawl control member 30 is operated to contact with the slant faces 7a to swing the pawls 7, thereby enabling the pawl tips to disengage from the ratchet teeth 21.

In addition, the pawl spring 9 may be formed of a coil spring wound around the pin 8 and retained at one end to each pawl 7 and at the other end to the extension 6. Besides this, the pawl spring 9 may, as shown in FIGS. 2 and 3, be formed in a C-like shape and be bent inwardly at both ends to form projections 9a, which are inserted into the through bores 6a at the cylindrical extension 6.

In this instance, at the outer periphery of extension 6 is provided a circumferential groove 6b communicating with the through bores 6a. The pawls 7 have grooves 7b for receiving therein both end portions of the C-like shaped pawl spring 9. The pawl spring 9 of C-like shape is inserted into the groove 6b and grooves 7b, and abuts against contact jaws 7c at one end of each groove 7b to thereby bias the tips of pawls 7 to mesh with the ratchet teeth 21.

Hence, when the pawl spring 9 is formed in a C-like shape, only one is needed in comparison with use of coil springs. Furthermore, the C-like shaped spring 9 is simple to assemble and easy to maintain as it causes less trouble.

A sun gear 10 is provided at the hub shaft 4 axially outwardly over the cylindrical extension 6. A gear frame 12 having a plurality of planetary gears 11 in mesh with the sun gear 10 is disposed axially outwardly of and axially in alignment with the cylindrical extension 6 and supported rotatably to the hub shaft 4. A unidirectionally rotary transmission mechanism 13 is provided between the cylindrical extension 6 and the gear frame 12.

The unidirectionally rotary transmission mechanism 13 comprises ratchet teeth 14 provided at the inner periphery of an axial end portion of cylindrical extension 6 and second transmitting-pawls 15 which are provided at the gear frame 12 and mesh with the ratchet teeth 14, the second transmitting-pawls 15 being biased by spring means 16 to always mesh with the ratchet teeth 14. The gear frame 12, when rotating in one direction, transmits the driving force to the cylindrical extension 6 and hub shell 2, and when rotating in the reverse direction, does not transmit the driving force to the extension 6 because of disengagement of the second pawls 15 from the ratchet teeth 14.

Reference numeral 20 designates a driving member covering the cylindrical extension 6 and gear frame 12. The driving member 20 is provided at the inner periphery of the axially inside portion thereof with ratchet teeth 21 in mesh with the first transmitting pawls 7, at the inner periphery of the axially outside portion with inner teeth 22 in mesh with the planetary gears 11, and at the outer periphery with at least one sprocket 23, and is supported rotatably with respect to the hub shaft 4 through a pair of first and second ball bearing means $B_3$ and $B_4$.

The first bearing means $B_3$ is provided at the outer periphery of extension 6 and supports the driving member 20 at the axially inside portion thereof. The second bearing $B_4$ is provided at the outer periphery of a support 24 screwed with the hub shaft 4 and supports the driving member 20 at the axially outside portion thereof.

The aforesaid construction is applicable to a two-stage transmission of low and high speed. An operating member 40 at the control mechanism to be hereinafter described is operated to allow the control member 30 to move axially of the hub shaft 4 to thereby perform shifting of the two-stage transmission.

In detail, the high speed stage is shown in FIGS. 2 and 3, in which the control member 30 is positioned apart from the slant faces 7a at the first transmitting-pawls 7 which mesh with the ratchet teeth 21.

Accordingly, the driving force from the sprocket 23 is transmitted from the driving member 20 to the cylindrical extension 6 by way of the first transmitting-pawls 7, whereby the hub body 1 is rotated at a ratio of 1 to 1 with respect to the driving member 20.

At this time, the gear frame 12 also rotates at a lower speed than the extension 6, whereby the second transmitting-pawls 15 become idle to allow the extension 6 to freely rotate with respect to the gear frame 12.

When changing the speed from the above high speed stage to the low speed stage, the operating member 40 is moved leftwardly in FIG. 2 to allow the control member 30 to move leftward against a return spring 25 to be hereinafter described, and pushes the slant faces 7a at the first transmitting-pawls 7, whereby the first transmitting-pawls 7 disengage from the ratchet teeth 21.

Hence, the driving force is transmitted from the sprocket 23 to the planetary gears 11 through the inner teeth 22 at the driving member 20, whereby the gear frame 12 rotates at reduced speed. The reduced driving force is transmitted from the gear frame 12 to the cylindrical extension 6 through the second transmitting-pawls 15 to thereby rotate the hub body 1 at low speed.

The control mechanism of the invention serves to control the first transmitting-pawls 7 in an active or pausal condition, at the transmission hub constituted as aforegoing. The control mechanism comprises the pawl control member 30 and the operating member 40 for reciprocating the control member 30 axially of the hub shaft 4.

The pawl control member 30 is disposed in front of the gear frame 12 and inside the cylindrical extension 6, supported only axially movably to the hub shaft 4, and biased to always contact with the end face of gear frame 12 through a return spring 25 retained at one end thereof to the hub shaft 4.

The operating member 40 comprises a speed-change key 41 engageable with a keyway 30a at the control member 30 and a rod 42 engageable in association with the key 41. The key 41 is movably mounted into a slot 4a at the hub shaft 4. The rod 42 is inserted axially movably through a central bore 4b extending axially of the hub shaft 4 from the end face thereof to the slot 4a, and projects from the end face to be operable by well-known operating means.

The pawl control member 30 is as a whole formed in a substantially cylindrical shape, and is provided at the rear side in the direction of moving for controlling the transmitting-pawls 7 in the pausal condition with a holding portion 31 comprising the peripheral surface by which the pawls 7 are kept in the pausal condition, at the front side in the above moving direction with a plurality of pawl-receiving portions 32 having depressed faces, and between the adjacent pawl-receiving portions 32 with control portions 33 having slant faces in continuation of the depressed faces and peripheral surface of holding portion 31, so that the pawls 7 received at the tails thereof within the pawl-receiving portions 32 may be controlled in the pausal condition by means of the slant faces respectively.

The pawl control member 30 shown in FIGS. 2 through 5 has the two control portions 33 shifted at a phase angle of 180° as seen from FIGS. 3 and 4, and is scraped between the control portions 33, in cresent shape looking from the front to thereby form the pawl-receiving portions 32. The control portions 33 each comprise a pair of first control portions 33a comprising slant faces in continuation of the pawl-receiving portions 32 and for controlling the pawls 7 in the pausal condition, and a second control portion 33b having a slant face guiding to the holding portions 31 the pawls 7 controlled in the pausal condition, the slant faces at first control portions 33a being three dimensional axially and radially of the pawl control member 30.

In addition, a border between each of the first control portions 33a and the second control portion 33b may be angular, but is preferred to be in the shape of a circular-arc.

Next, operation of the aforesaid pawl control member 30 for controlling the transmitting-pawls 7 will be described hereinafter.

When the pawl control member 30 is moved leftwardly in FIG. 2, the first transmitting-pawls 7 at first enter at the tails thereof into the pawl-receiving portions 32 respectively. In this condition, the pawls 7 are still kept in engagement with the ratchet teeth 21. When the pawls 7 rotate around the hub shell 4 following rotation of the cylindrical extension 6, the slant faces 7a at the tails of pawls 7 contact with the first control portions 33a, whereby the pawls 7 gradually swing around the pins 8 along the slant faces at the first control portions 33a so as to be nearly in the pausal condition respectively. Thereafter, the pawls 7 transfer at the trails from the first control portions 33a to the second control portion 33b, and further swing by contact with the slant faces thereat, thus being completely in pausal condition to thereby disengage from the ratchet teeth 21. Then, the tails of pawls 7 climb onto the peripheral surface at the holding portion 31 from the slant face at second control portion 33b, whereby the pawls 7 are kept in the pausal condition of disengaging from the ratchet teeth 21.

Accordingly, the pawl control member 30 constructed as described is able to reliably and non-forcibly control the pawls 7 in the pausal condition.

The control member 30, other than constructed as just described, may be formed as shown in FIG. 6 or 7.

In detail, the control member 30 shown in FIG. 6 is basically similar to that shown in FIGS. 4 and 5, and has four pawl-control portions 33, and the pawl-receiving portions 32 between each portion 33 are formed of axially backwardly concave faces, whose rising ends are connected with the control portions 33 respectively. The control member 30 shown in FIG. 7 has four pawl-control portions 33, and the pawl-receiving portions 32 between each control portion 33 are formed of radially inwardly concave faces, whose rising ends are connected to the control portions 33 respectively.

Also, these pawl control members 30 control the transmitting pawls 7 causing them to disengage from the ratchet teeth 21 smoothly and reliably, similarly to the pawl control members shown in FIGS. 4 and 5.

The above described embodiments have two or more control portions 33, but only one control portion 33 is needed when a signal pawl 7 is used.

As clearly understood from the above description, the control mechanism of the invention utilizes rotation of the transmitting-pawl rotating together with the hub shell around the hub shaft so that the control member may control smoothly and reliably in a pausal condition the transmitting-pawl received at the tail thereof within the pawl control member receiving portions. Also, the pawl control member is able to reliably control the pawl with a light touch even when the control movement of the same is short.

Furthermore, the pawl and its associated shaft are not subjected to excessive force to thereby improve durability.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A control mechanism for a transmitting-pawl which is supported swingably around a shaft parallel to a hub shaft in a transmission hub of a bicycle, said pawl being biased into an active condition where said pawl is engaged with ratchet teeth of said transmission hub by means of a pawl spring, said control mechanism being operable to move said pawl so it disengages from said ratchet teeth and comprising a pawl control member supported movably to said hub shaft and an operating member for moving said control member axially of said hub shaft, said pawl control member being substantially cylindrical and being provided at the rear side thereof in the direction of its movement to control said pawl to disengage from said ratchet teeth with a holding portion having a peripheral surface which contacts with said pawl to retain said pawl in a condition of disengagement from said ratchet teeth, said control member being provided at the front side thereof in its moving direction with at least one pawl-receiving portion having a depressed face for receiving therein said pawl when said pawl is in its active condition, said control member being further provided at both circumferential sides of said pawl-receiving portion with control portions which are provided in continuation of the depressed face of said pawl-receiving portion and of said peripheral surface of said holding portion, said control portions having slant faces for controlling movement of said pawl received within said pawl-receiving portion to said disengaged condition.

2. A control mechanism for a transmitting-pawl at a transmission hub for a bicycle according to claim 1, wherein each of said control portions at said pawl control member comprises:

first control portions having slant faces in continuation of said pawl receiving portion to control movement of said transmitting-pawl to said disengaged condition, and a second control portion having a slant face for guiding said transmitting-pawl in a disengaged condition to said holding portion.

3. A control mechanism for/transmitting-pawl at a transmitting hub for a bicycle according to claim 2, wherein said slant faces at said first control portions are slant axially of said pawl control member.

4. A control mechanism for/transmitting-pawl at a transmission hub for a bicycle according to claim 2, wherein said slant faces at said first control portions are slant radially of said pawl control member.

5. A control mechanism for/transmitting-pawl at a transmission hub for a bicycle according to claim 2, wherein said slant faces at said first control portions are slant in the three dimensional direction axially and radially of said pawl control member.

* * * * *